US009520592B2

(12) United States Patent
Tamaki et al.

(10) Patent No.: US 9,520,592 B2
(45) Date of Patent: Dec. 13, 2016

(54) LITHIUM SECONDARY BATTERY

(75) Inventors: Takumi Tamaki, Nisshin (JP); Hiroki Nagai, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 111 days.

(21) Appl. No.: 14/240,856

(22) PCT Filed: Aug. 2, 2012

(86) PCT No.: PCT/JP2012/069754
§ 371 (c)(1),
(2), (4) Date: Feb. 25, 2014

(87) PCT Pub. No.: WO2013/031477
PCT Pub. Date: Mar. 7, 2013

(65) Prior Publication Data
US 2014/0199590 A1 Jul. 17, 2014

(30) Foreign Application Priority Data
Aug. 26, 2011 (JP) ................................ 2011-185333

(51) Int. Cl.
*H01M 4/131* (2010.01)
*H01M 4/1391* (2010.01)
(Continued)

(52) U.S. Cl.
CPC ........... *H01M 4/131* (2013.01); *H01M 4/1391* (2013.01); *H01M 4/362* (2013.01);
(Continued)

(58) Field of Classification Search
None
See application file for complete search history.

(56) References Cited

U.S. PATENT DOCUMENTS 5,702,845 A 12/1997 Kawakami et al.
2010/0140554 A1* 6/2010 Oki ........................ H01M 4/131
252/500

(Continued)

FOREIGN PATENT DOCUMENTS

CN 103493261 A 1/2014
EP 2 701 223 2/2014
(Continued)

OTHER PUBLICATIONS

JP2009117241A En Translation—2009.*
(Continued)

*Primary Examiner* — Patrick Ryan
*Assistant Examiner* — Lucas J O'Donnell
(74) *Attorney, Agent, or Firm* — Finnegan, Henderson, Farabow, Garrett & Dunner, LLP

(57) ABSTRACT

A lithium secondary battery exhibiting low temperature output characteristics is provided. The lithium secondary battery of the present invention includes a current collector 12, and an active material layer 14 which is supported on the current collector 12 and contains active material particles 30 and electrically conductive material 16. The active material particles 30 each have a shell composed of a lithium transition metal oxide, a hollow part formed in the shell, and a through hole penetrating the shell. The electrically conductive material 16 contained in the active material layer 14 are arranged both in the hollow part of the active material particles and between the active material particles 30.

12 Claims, 9 Drawing Sheets

(51) Int. Cl.
*H01M 4/36* (2006.01)
*H01M 10/052* (2010.01)
*H01M 4/02* (2006.01)

(52) U.S. Cl.
CPC .... *H01M 10/052* (2013.01); *H01M 2004/021* (2013.01); *Y02E 60/122* (2013.01); *Y10T 29/49108* (2015.01)

(56) References Cited

U.S. PATENT DOCUMENTS

2010/0230641 A1 9/2010 Oki et al.
2012/0264021 A1 10/2012 Sugiura et al.
2012/0282525 A1 11/2012 Nagai et al.

FOREIGN PATENT DOCUMENTS

| EP | 2 706 599 | 3/2014 |
|---|---|---|
| JP | 8-321300 | 12/1996 |
| JP | 2000-82464 | 3/2000 |
| JP | 2003-173777 | 6/2003 |
| JP | 2008-34378 | 2/2008 |
| JP | 2009-117241 | 5/2009 |
| JP | 2011-119092 | 6/2011 |
| WO | WO 2011/067982 A1 | 6/2011 |

OTHER PUBLICATIONS

"Carbon Black," World Health Organization International Agency for Research on Cancer, IARC Monographs on the Evaluation of Carcinogenic Risks to Humans, vol. 93 (2010), pp. 43-191, Jan. 1, 2010.

"Introduction of Denka Black," Denki Kagaku Kogyo KK, p. 20 pp., Jan. 1, 2004.

* cited by examiner (SAMPLE 1)

(SAMPLE 2)

(SAMPLE 3)

(SAMPLE 5)

LITHIUM SECONDARY BATTERY

CROSS-REFERENCE TO RELATED APPLICATIONS

This application is a national phase application of International Application No. PCT/JP2012/0697564, filed Aug. 2, 2012, and claims the priority of Japanese Application No. 2011-195333, filed Aug. 26, 2011, the content of both of which is incorporated herein by reference.

TECHNICAL FIELD

The present invention relates to a lithium secondary battery, and specifically to a lithium secondary battery including a current collector and an active material layer supported on the current collector, the active material layer containing active material particles and an electrically conductive material.

This international application claims priority based on Japanese Patent Application No. 2011-185333 filed on 26 Aug. 2011, and the contents of that application are incorporated in their entirety in this Description by reference.

BACKGROUND ART

In recent years, lithium ion batteries, nickel hydrogen batteries, and other secondary batteries are growing in importance as power supplies for vehicles, personal computers, and portable terminals. In particular, lithium secondary batteries have a light weight and a high energy density, and thus are suitable as a high-output power supplies for vehicles. A lithium secondary battery includes positive and negative electrodes each containing a material (active material) reversibly stores and releases lithium ions (Li ions), and is charged and discharged by the migration of Li ions between the positive and the negative electrodes.

Typical examples of the active material contained in a positive electrode of a lithium secondary battery (positive electrode active material) includes a lithium transition metal oxide containing lithium and a transition metal element. A preferred example is a lithium transition metal oxide containing at least nickel (Ni) as the transition metal element (nickel-containing lithium transition metal oxide) having a layered structure. The lithium transition metal oxide has low electron conductivity, and thus is normally used in the form of a mixture with an electrically conductive material such as carbon powder, Patent Literature 1 is a technical literature relating to the active materials and electrically conductive materials of lithium secondary batteries.

CITATION LIST

Patent Literature

Patent Literature 1: Japanese Patent Application Laid-Open No. 2003-173777

SUMMARY OF INVENTION

Vehicles whose wheels are driven by an electric motor, such as so-called hybrid vehicles (including plug-in hybrid vehicles) and electric vehicles can run by electric power alone stored in a battery. These vehicles must run even at low temperatures in cold climate areas and winter season, and the power supply under these conditions must have excellent output characteristics at low temperatures.

Patent Literature 1 describes a technique for combining carbon powder with a positive electrode active material by a spray-dry method, thereby improving the output characteristics. However, according to the technique, the positive electrode active material is supported around the carbon powder, so that the particles of the carbon powder are poorly contacted with each other, and the electrically conductive paths (electrically conductive channels) in the positive electrode active material tend to be thin. Therefore, electron transfer between the positive electrode active material and the positive electrode current collector is not efficiently carried out, and voltage decrease can occur during high power usage. In particular, in a low temperature environment, reactivity of the positive electrode active material and Li ion diffusivity in the positive electrode active material layer tend to decrease, and thus the above-described performance deterioration (for example, voltage decrease during high power usage) tends to occur. The present invention is intended to solve these problems.

The lithium secondary battery according to the present invention includes a current collector and an active material layer supported on the current collector, the active material layer containing active material particles and an electrically conductive material. The active material particles each have a shell composed of a lithium transition metal oxide, a hollow part formed in the shell, and a through hole penetrating the shell. The electrically conductive material contained in the active material layer is arranged both in the hollow part of the active material particles and between the active material particles.

In the structure according to the present invention, the electrically conductive material (powder) contained in the active material layer is typically smaller than the active material particles (for example, about 4 to 5 μm), and enters into the spaces between the active material particles. The electrically conductive material arranged between the active material particles forms electrically conductive paths (electrically conductive channels) between the active material particles. The active material particles each have a hollow structure composed of a shell and a hollow part formed in the shell, and the shell is penetrated by a through hole from the outside to the hollow part of the shell. A portion of the electrically conductive material is smaller than the opening width (for example, about 1 μm) of the through hole, and enters into the hollow part of the active material particles through the through hole. The portions of the electrically conductive material arranged in the hollow part of the active material particles and between the active material particles are electrically connected through the through holes. As a result of this, electrically conductive paths are included in the active material particles.

In the structure, the portion of the electrically conductive material arranged between the active material particles establishes electrically conductive paths (electrically conductive channels) between the active material particles, and the other portion of the electrically conductive material arranged in the hollow part of the active material particles incorporates the electrically conductive paths in the active material particles. Accordingly, giving and receiving of electrons can occur even in the active material particles, and thus the utilization factor of the active material particles can be increased. In addition, the increase of the electron conductivity in the active material particles results in the further decrease of internal resistance. The use of the electrode allows the appropriate reduction of the voltage decrease caused by internal resistance even during high power usage in a low temperature environment (for example, an environment having a temperature of about −30° C.). Accordingly, the present invention provides a lithium secondary battery having markedly improved output characteristics at low temperatures.

In the present description, the term "lithium secondary battery" refers to a secondary battery which includes lithium ions as electrolyte ions, and is charged or discharged by charge transfer due to lithium ions between the positive and the negative electrodes. Batteries generally called lithium ion batteries are typical examples of the lithium secondary battery referred in the present description.

According to a preferred aspect of the lithium secondary battery disclosed herein, the electrically conductive material arranged in the hollow part of the active material particles are formed independent of the active material particles. In the structure, the active material particles are not incorporated with the electrically conductive material, but the electrically conductive material is arranged independent of the active material particles, such that the reaction of the active material will not be inhibited. As a result of this, higher battery performance is achieved.

According to a preferred aspect, in the particle size distribution determined by laser diffraction of the electrically conductive material (typically in the form of powder), the 10% accumulated particle diameter (more specifically the particle diameter corresponding to the 10% accumulated particle size from the fine particle side in the particle size distribution based on volume; D10) is 0.25 μm or less, and the 90% accumulated particle diameter (more specifically the particle diameter corresponding to the 90% accumulated particle size from the fine particle side in the particle size distribution based on volume; D90) is 1 μm or more. When the electrically conductive material having this particle size distribution is used, thick electrically conductive paths (electrically conductive channels) are formed between the active material particles, and an appropriate amount of the electrically conductive material is arranged in the hollow part of the active material particles.

According to a preferable aspect of the lithium secondary battery disclosed herein, the ratio of the portion of the electrically conductive material arranged in the hollow part of the active material particles is from 3% by mass to 30% by mass, and preferably from 10% by mass to 20% by mass with reference to the total mass of the electrically conductive material contained in the active material layer. In this structure, a good balance is achieved between the proportions of the portion of the electrically conductive material arranged in the hollow part of the active material particles and the other portion of the electrically conductive material arranged between the active material particles. As a result of this, improvement of the battery performance owing to the arrangement of the electrically conductive material in the hollow part of the active material particles (for example, reduction of voltage decrease during low temperature output) is appropriately achieved, and at the same time thick electrically conductive paths (electrically conductive channels) are formed between the active material particles. Accordingly, better battery performance is reliably achieved.

The lithium transition metal oxide is preferably a compound having a layer structure and containing at least nickel as a constituent element. The use of the active material particles having this composition allows assembly of a lithium secondary battery having higher performance. For example, a compound having a layer structure and containing nickel, cobalt, and manganese as constituent elements is preferred.

The present invention also provides a method of producing any of the lithium secondary batteries disclosed herein. The production method includes preparing active material particles with a holed hollow structure each having a shell composed of a lithium transition metal oxide, a hollow part formed in the shell, and a through hole penetrating the shell. The production method also includes a step of forming an active material layer forming composition (more specifically, a composition in the form of a paste or slurry) by mixing the active material particles, an electrically conductive material, and a solvent (composition formation step). The production method also includes a step of applying the active material forming composition to a current collector, thereby obtaining an electrode composed of an active material layer formed on the current collector. Also included is a step of assembling a lithium secondary battery using the electrode. The composition formation step uses an electrically conductive material and active material particles with a holed hollow structure, the electrically conductive material having a particle size distribution which allows the entry of a portion of the electrically conductive material into the hollow part of the active material particles through the through holes. According to the production method, a lithium secondary battery in which the electrically conductive material contained in the active material layer is arranged both in the hollow part of the active material particles and between the active material particles is appropriately produced. In addition, according to the production method, the electrically conductive material is arranged independent of the active material particles, without incorporating the active material particles with the electrically conductive material. As a result of this, a lithium secondary battery having a higher performance is produced without inhibition of reaction of the active material particles.

As the electrically conductive material with the above-described particle size distribution, preferably an electrically conductive material having a 10% accumulated particle diameter (D10) of 0.25 μm or less and a 90% accumulated particle diameter (D90) of 1 μm or more is used. As described above, the structure including the electrically conductive material with a 10% accumulated particle diameter of 0.25 μm or less is effective for arranging a portion of the electrically conductive material in the hollow part of the active material particles through the through holes. However, if the particle diameter of the electrically conductive material is simply decreased, the portion of the electrically conductive material arranged between the active material particles has a small particle diameter, and thus the electrically conductive paths (electrically conductive channels) formed between the active material particles tend to be thin. According to the production method disclosed herein, as described above, the electrically conductive material having the specific particle size distribution with a 10% accumulated particle diameter (D10) of 0.25 μm or less and a 90% accumulated particle diameter (D90) of 1 μm or more is used thereby arranging an appropriate amount of the electrically conductive material in the hollow part of the active material particles, and arranging relatively large particles of the electrically conductive material between the active material particles. As a result of this, thick electrically conductive paths (electrically conductive channels) are formed between the active material particles, while an appropriate amount of the electrically conductive material is arranged in the hollow part of the active material particles.

According to a preferred aspect of the method of producing a lithium secondary battery disclosed herein, the composition formation step includes a first mixing step of mixing the electrically conductive material and the solvent to form an electrically conductive material composition, a second mixing step of mixing the electrically conductive material composition and the active material particles to obtain the active material forming composition. In the first mixing step, the electrically conductive material is mixed under grinding such that the electrically conductive material has a particle size distribution which allows a portion of the electrically conductive material to enter into the hollow part of the active material particles through the through holes and to be arranged therein. When the active material forming composition is formed according to this aspect including the first and second mixing steps, a lithium secondary battery in which the electrically conductive material contained in the active material layer is arranged both in the hollow part of the active material particles and between the active material particles is appropriately produced.

In any of the lithium secondary batteries disclosed herein, as described above, voltage decrease is well reduced during low temperature output. Therefore, the battery is suitable as a battery mounted on, for example, a vehicle such as an automobile (typically a battery for a driving power supply). Accordingly, the present invention provides a vehicle including any of the lithium secondary batteries disclosed herein (the battery may be in the form of a battery pack composed of a plurality of batteries connected to each other). Specifically, vehicles including the lithium secondary battery as the power supply (for example, a plug-in hybrid vehicle (PHV) or an electric vehicle (EV) which can be charged from a domestic power supply) are provided.

DESCRIPTION OF EMBODIMENTS

Preferred embodiments of the present invention are described below with reference to drawings. The drawings are schematic and do not necessarily reflect the actual size.

Those matters required to carry out the present invention, with the exception of those matters specifically mentioned in the present specification, can be understood to be design matters of a person with ordinary skill in the art based on the prior art in the relevant technical field. The present invention can be carried out based on the contents disclosed in the present specification and common general technical knowledge in the relevant field.

Figure 1:
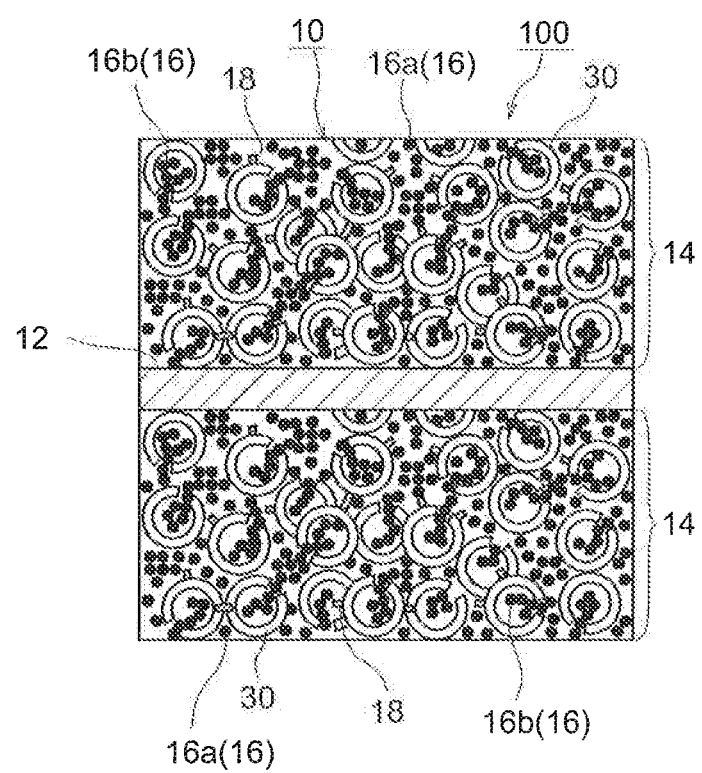
FIG. 1 is a cross sectional view schematically showing an electrode used in an embodiment of the present invention.

A lithium secondary battery 100 according to an embodiment of the present invention includes, as shown in FIG. 1, an electrode 10 having a current collector 12 and porous active material layers 14. Although there are no particular limitations thereon, the electrode used in the present embodiment is described below, with reference to a positive electrode (positive electrode sheet) 10 for the lithium secondary battery 100 including a foil-shaped positive electrode current collector (aluminum foil) 12 made mainly of aluminum. FIG. 1 is a cross sectional view of the positive electrode 10.

The positive electrode 10 according to an embodiment disclosed herein has a structure shown in FIG. 1, in which the positive electrode active material layers 14 containing positive electrode active material particles 30, an electrically conductive material 16, and a binder 18 are supported on the surfaces (herein both sides) of the positive electrode current collector 12. The positive electrode current collector 12 is preferably made of aluminum foil or other metal foil suitable as positive electrode.

The positive electrode active material particles 30 may be composed of one or two or more substances used in the conventional lithium secondary batteries without particular limitation. Preferred examples of the use of the technique disclosed herein include a positive electrode active material composed mainly of an oxide (lithium transition metal oxide) containing lithium and one or two or more transition metal elements as constituent metal elements, such as a lithium nickel oxide (for example, $LiNiO_2$), a lithium cobalt oxide (for example, $LiCoO_2$), or a lithium manganese oxide (for example, $LiMn_2O_4$). The lithium transition metal oxide is preferably a compound with a layered rock salt structure containing nickel as a constituent element. Particularly preferred is a positive electrode active material composed mainly of a lithium nickel cobalt manganese complex oxide (for example, $LiNi_{1/3}Co_{1/3}Mn_{1/3}O_2$) containing nickel, cobalt and manganese (typically a positive electrode active material substantially composed of a lithium nickel cobalt manganese complex oxide).

The term "lithium nickel cobalt manganese complex oxide" means oxides containing Li, Ni, Co, and Mn as constituent metal elements, and also means oxides containing at least one additional element besides Li, Ni, Co and Mn. Examples of the additional element include the elements belonging to Group 1 (alkali metals such as sodium), Group 2 (alkaline earth metals such as magnesium and calcium), Group 4 (transition metals such as titanium and zirconium), Group 6 (transition metals such as Chromium and tungsten), Group 8 (transition metals such as iron), Group 13 (semimetals such as boron, or metals such as aluminum) and Group 17 (halogens such as fluorine) of the periodic table. Typical examples include W, Zr, Mg, Ca, Na, Fe, Cr, Zn, Si, Sn, Al, B, and F. The same applies to lithium nickel oxides, lithium cobalt oxides, and lithium manganese oxides.

<<Hollow Structure>>

Figure 2:
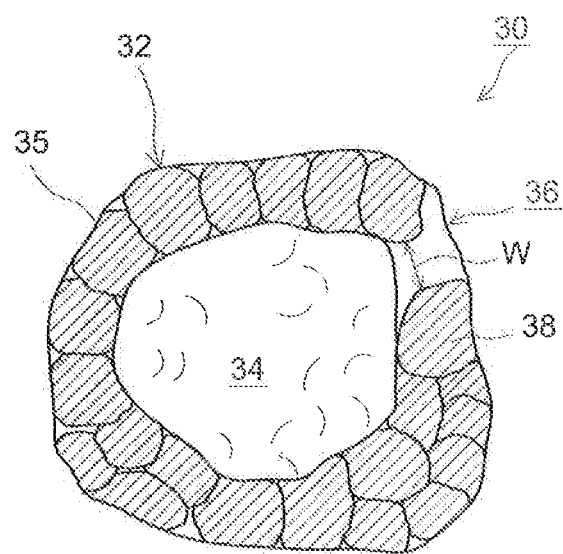
FIG. 2 is a cross sectional view schematically showing an active material particles used in an embodiment of the present invention.

The positive electrode active material particles 30 used in the present embodiment include, as shown in FIG. 2, a shell 35, a hollow part 34 formed in the shell 35, and a through hole 36 penetrating the shell 35. The shell 35 is composed of primary particles 38 aggregated to form a spherical shell. In other words, the positive electrode active material particles 30 are holed hollow active material particles having a hollow structure composed of a secondary particle 32 formed of the aggregated primary particles 38, and the hollow part 34 formed therein, the secondary particle 32 has the through hole 36 penetrating from the outside to the hollow part 34. The D50 diameter (median value (d50) determined from the particle size distribution measured by a particle size distribution analyzer in accordance with a laser beam scattering method) of the secondary particle is about 1 μm to 25 μm (preferably about 1 μm to 10 μm, more preferably about 3 μm to 8 μm).

<<Electrically Conductive Material>>

The electrically conductive material 16 used in the positive electrode active material layer is, for example, a carbon material such as carbon powder or carbon fiber. These electrically conductive materials may be used alone or in combination of two or more of them. Examples of the carbon powder include various types of carbon black (for example, acetylene black, oil furnace black, graphite carbon black, carbon black, graphite, and ketjen black), and graphite powder. The electrically conductive material 16 typically has a smaller particle diameter than the positive electrode active material particles 30.

<<Binder>>

The binder 18 used in the positive electrode active material layer binds the positive electrode active material particles 30 and the electrically conductive material 16, and the material constituting the binder itself may be made of the same material as that used in positive electrodes of known lithium secondary batteries.

For example, when the below-described positive electrode active material layer forming composition is a solvent-based solution (a solution including an organic solvent as the main dispersion medium) composition, the binder may be a polymer dispersible or soluble in the solvent-based solution. Preferred examples of the polymer dispersible or soluble in the solvent-based solution include polyvinylidene fluoride (PVDF) and poly vinylidene chloride (PVDC). When the positive electrode active material layer forming composition is an aqueous solution (a solution including water or a mixed solvent composed mainly of water as the dispersion medium) composition, the binder is preferably a polymer dispersible or soluble in water. Examples of the polymer dispersible or soluble in water include styrene-butadiene rubber (SBR), carboxymethyl cellulose (CMC), polytetrafluoroethylene (PTFE), polyethylene (PE), and polyacrylic acid (PAA). Any of these polymer materials is used as a binder, and may be added as an additive such as a thickening agent for the composition.

<<Arrangement of Electrically Conductive Material>>

In the positive electrode active material layer 14 disclosed herein is, as shown in FIG. 1, the positive electrode active material particles 30 are bound together by the action of the binder 18. In the positive electrode active material layer 14, the positive electrode active material particles 30 are bound together by the binder 18, so that many minute holes are present between the particles. The electrically conductive material 16 is typically smaller than the positive electrode active material particles 30, and thus enters into the spaces between the positive electrode active material particles 30. The electrically conductive material 16a arranged between the positive electrode active material particles 30 forms electrically conductive paths between the positive electrode active material particles 30, and thus electrically connecting the positive electrode active material particles 30 and the positive electrode current collector 12.

The positive electrode active material particles 30 have a hollow structure composed of the shell 35 and the hollow part 34 formed therein, and the through hole 36 penetrating the shell 35 from the outside to the hollow part 34 (see FIG. 2). A portion 16b of the electrically conductive material 16 is smaller than the opening width h of the through hole 36, and enters into the hollow part 34 of the positive electrode active material particles through the through hole 36. The electrically conductive material 16b arranged in the hollow part 34 of the positive electrode active material particles and the electrically conductive material 16a external to the active material are electrically connected through the through hole 36. As a result of this, electrically conductive paths are included in the positive electrode active material particles 30.

In the lithium secondary battery 100 having this structure, electrically conductive paths are established between the positive electrode active material particles by the electrically conductive material 16a arranged between the positive electrode active material particles 30, and also included in the positive electrode active material particles 30 by the electrically conductive material 16b arranged in the hollow part 34 of the active material particles. As a result of this, giving and receiving of electrons occurs even in the positive electrode active material particles, and thus the utilization of the positive electrode active material is increased. In addition, the electron conductivity in the positive electrode active material particles 30 is improved, and thus the internal resistance is further reduced. The use of the positive electrode 10 appropriately reduces the voltage decrease caused by internal resistance even under high-rate usage in a low temperature environment (for example, a severe low temperature environment at −30° C.). According to this structure, a lithium secondary battery having good output characteristics (in particular markedly improved output characteristics in low temperature environments) is provided.

In this case, the ratio of the electrically conductive material 16b arranged in the hollow part of the active material particles 34 is about 3% by mass to 30% by mass, and preferably from 10% by mass to 20% by mass with reference to the total mass of the electrically conductive material. 16 contained in the positive electrode active material layer 14. The electrically conductive material 16b arranged in the hollow part 34 of the active material particles may include the electrically conductive material arranged in the through hole 36. According to this structure, a good balance is achieved between the proportions of the electrically conductive material 16b arranged in the hollow part 34 of the active material particles and the electrically conductive material 16a arranged external to the active material, so that the battery performance improvement effect owing to the arrangement of the electrically conductive material 16b in the hollow part 34 of the active material particles (for example, reduction of the voltage decrease during low temperature output) is appropriately achieved, and at the same time electrically conductive paths are sufficiently established between the positive electrode active material particles 30. Accordingly, higher battery performance is reliably achieved.

Although there are no particular limitations thereon, the ratio of the positive electrode active material to the whole of the positive electrode active material layer is preferably about 50% by mass or more (typically from 90 to 99% by mass), and more preferably about 95 to 99% by mass. The ratio of the binder to the whole of the positive electrode active material layer is preferably, for example about 5% by mass or less, and more preferably about 1% by mass or less (for example, about 0.5 to 1% by mass, such as 0.8% by mass). The ratio of the electrically conductive material to the whole of the positive electrode active material layer is preferably about 10% by mass or less, and more preferably about 9% by mass or less (for example, about 8% by mass). If the ratio of the electrically conductive material is too high, the mass of the positive electrode active material, per unit volume decreases, so that the desired energy density may not be achieved. On the other hand, if the ratio of the electrically conductive material is too low, the electrically conductivity of the positive electrode active material layer decreases, and thus the internal resistance may increase.

In the next place, the method of producing the battery electrode (herein battery positive electrode) disclosed herein is described below.

<Production Method>

The method of producing the positive electrode 10 disclosed herein preferably includes the following steps. More specifically, the method includes a step of providing the positive electrode active material particles 30 having a holed hollow structure composed of the shell 35 made of a lithium transition metal oxide, the hollow part 34 formed in the shell 35, and the through hole 36 penetrating through the shell 35 (provision step); a step of mixing the positive electrode active material particles 30 with the electrically conductive material 16 and a solvent to form a positive electrode active material layer forming composition (composition formation step); and a step of applying the positive electrode active material forming composition to a positive electrode current collector (typically by coating and drying) to obtain a positive electrode composed of a positive electrode active material layer formed on a positive electrode current collector (coating step). The composition formation step uses an electrically conductive material having a particle size distribution which allows a portion of the electrically conductive material to enter into the hollow part of the active material particles through the through hole and to be arranged therein, and active material particles having a holed hollow structure. The electrically conductive material having the specific particle size distribution and the active material particles having a holed hollow structure are subjected to the subsequent coating step, and the positive electrode 10 including the electrically conductive materials 16a and 16b arranged both in the hollow part 34 of the positive electrode active material particles and between the positive electrode active material particles 30 is obtained.

In the provision step, the positive electrode active material particles 30 having a holed hollow structure composed of the shell 35 made of a lithium transition metal oxide, the hollow part 34 formed in the shell 35, and the through hole 36 penetrating through the shell 35 is provided. The positive electrode active material particles having a holed hollow structure can be produced by, for example, a method including depositing a transition metal hydroxide from an aqueous solution containing at least one of transition metal elements of the lithium transition metal oxide composing the active material particles (preferably all the metal elements other than lithium contained in the oxide) under appropriate conditions (starting hydroxide formation step), and mixing the transition metal hydroxide with a lithium compound and burning the mixture.

In this case, the starting hydroxide formation step preferably includes a nucleation step of depositing a transition metal hydroxide from an aqueous solution at pH 12 or more and an ammonium ion concentration of 25 g/L or less, and a particle growing step of growing the deposited transition metal hydroxide at less than pH 12 and an ammonium ion concentration of 3 g/L or more. The burning step is preferably carried out in such a manner that the maximum burning temperature is from 800° C. to 1100° C. According to this production method, the active material particles having a preferred holed hollow structure disclosed herein are appropriately produced.

In the mixing step, the positive electrode active material particles 30 having a holed hollow structure provided above is mixed with the electrically conductive material 16, a binder, and a solvent to form a positive electrode active material layer forming composition in the form of a paste or slurry. This composition may be hereinafter referred to as a paste.

Examples of the solvent include water and mixed solvents composed mainly of water. The solvent other than water composing the mixed solvent may be appropriately selected from one or two or more organic solvents which are uniformly miscible with water (for example, lower alcohols, and lower ketones). Alternatively, the solvent may be one or two or more organic solvents such as N-methylpyrrolidone (NMP), pyrrolidone, methyl ethyl ketone, methyl isobutyl ketone, cyclohexanone, toluene, dimethylformamide, or dimethylacetamide. The content of the solvent in the positive electrode active material layer forming paste is not particularly limited, but is preferably from 40 to 90% by mass, and particularly preferably about 50% by mass of the whole paste.

As descried above, in the battery positive electrode 10 disclosed herein, the electrically conductive material 16 contained in the positive electrode active material layer must be arranged both in the hollow part 34 of the positive electrode active material particles and between the positive electrode active material particles 30. One of preferred conditions for obtaining the battery positive electrode 10 is the use of an electrically conductive material having a particle size distribution which allows a portion of the electrically conductive material to enter into the hollow part of the active material particles through the through holes and to be arranged therein. For example, the electrically conductive material 16 preferably has a 10% accumulated particle diameter (D10) of 0.25 μm or less (for example, from 0.1 μm to 0.25 μm, preferably from 0.1 μm to 0.2 μm, and particularly preferably from 0.1 μm to 0.15 μm). When the electrically conductive material having a 10% accumulated particle diameter (D10) of 0.25 μm or less is used, an appropriate amount of the electrically conductive material is arranged in the hollow part 34 of the active material particles through the through holes.

It is further preferred that the electrically conductive material have a particle size distribution with a 90% accumulated particle diameter (D90) of 1 μm or more (for example, from 1 μm to 15 μm, and preferably from 3 μm to 12 μm). As described above, the structure including the electrically conductive material having a 10% accumulated particle diameter of 0.25 μm or less is effective for arranging the electrically conductive material at the hollow part 34 of the positive electrode active material particles through the through holes. However, if the particle diameter of the electrically conductive material is simply decreased, the portion of the electrically conductive material arranged between the positive electrode active material particles 30 also has a small particle diameter, and thus the electrically conductive paths (electrically conductive channels) between the positive electrode active material particles 30 tend to be thin. On the other hand, when an electrically conductive material having a relatively large particle size distribution with a 10% accumulated particle diameter (D10) of 0.25 μm or less and a 90% accumulated particle diameter (D90) of 1 μm or more is used, an appropriate amount of the electrically conductive material is arranged in the hollow part of the positive electrode active material particles, and relatively large particles of the electrically conductive material are arranged between the positive electrode active material particles. Accordingly, an appropriate amount of the electrically conductive material is arranged in the hollow part of the active material particles, and at the same time thick electrically conductive paths may be formed between the positive electrode active material particles. As a result of this, electron transfer may be efficiently achieved between the positive electrode active material layer 14 and the positive electrode current collector 12, and the electrical conductivity of the positive electrode active material layer 14 may be further improved.

Preferred examples of the electrically conductive material disclosed herein include those having a D10 of 0.25 μm or less and a D90 of 1 μm or more, a D10 of 0.2 μm or less and a D90 of 5 μm or more, and a D10 of 0.15 μm or less and a D90 of 10 μm or more. Preferred examples of the electrically conductive material include those having a particle size distribution wherein the 50% accumulated particle diameter (more specifically, in the particle size distribution on volume basis, the particle diameter corresponding to the 50% accumulated particle diameter from the fine particle side (median value; D50)) is 1 μm or less (for example, from 0.2 μm to 1 μm, and preferably from 0.3 μm to 0.8 μm), and the volume average diameter (MEAN Volume Diameter: MV value) is 0.5 μm or more (for example, from 0.5 μm to 5 μm, preferably from 1 μm to 4 μm). When the electrically conductive material having this particle size distribution is used, an appropriate amount of the electrically conductive material is arranged in the hollow part 34 of the positive electrode active material particles, while thick electrically conductive paths are formed between the positive electrode active material particles.

The preferred particle size distribution (D10 and D90) of the electrically conductive material depends on the opening width h of the through hole 36 formed in the shell 35 of the positive electrode active material particles 30. The opening width h of the through hole is the diameter of the narrowest part of the through hole in the channel from the outside to the hollow part of the positive electrode active material particles. In normal cases, the 10% accumulated particle diameter (D10) of the electrically conductive material is preferably smaller than the average opening width of the through hole, and, for example, more preferably about half or less, and particularly preferably about ⅓ or less the average opening width. The 90% accumulated particle diameter (D90) of the electrically conductive material is preferably greater than the average opening width of the through hole, and, for example, more preferably about double or more, and particularly preferably triple or more the average opening width. The average value of the opening width (the average opening width) of the through hole can be determined by, for example, measuring at least ten positive electrode active material particles for the opening size of the through hole of some or all of the particles, and calculating the arithmetic average of thereof. The average opening width of the through hole 36 disclosed herein may be about 0.1 μm to 0.2 μm or more (for example, from 0.1 μm to 2 μm, preferably from 0.5 μm to 2 μm). The average opening width of the through hole is particularly preferably about 1 μm to 2 μm. According to this embodiment, the above-described effect will be more favorably achieved.

In the paste formation step, the positive electrode active material particles having a holed hollow structure is mixed with the electrically conductive material, the binder, and the solvent to form a positive electrode active material layer forming paste. The operation of mixing (kneading) the positive electrode active material particles with the electrically conductive material, the binder, and the solvent may be carried out using, for example, an appropriate disperser. The disperser may be a media disperser or a medialess disperser. When a media disperser is used, ceramic beads such as glass or zirconia are charged into a disperser such as a ball mill, and mixed with the electrically conductive material. The media disperser may be used in combination with a medialess disperser such as a high pressure homogenizer, a jet mill, an ultrasonic disperser, a planetary mixer, or a disperser. In this case, it is preferred that the electrically conductive material be dispersed and mixed under grinding in such a manner that the electrically conductive material has a particle size distribution which allows a portion of the electrically conductive material in the disperser to enter into the hollow part of the active material particles and to be arranged therein, in other words, the positive electrode active material layer forming paste containing the electrically conductive material having the above-described specific particle size distribution can be obtained by appropriately selecting the kneading time by the disperser and kneading conditions such as treatment rotation speed.

Figure 3:
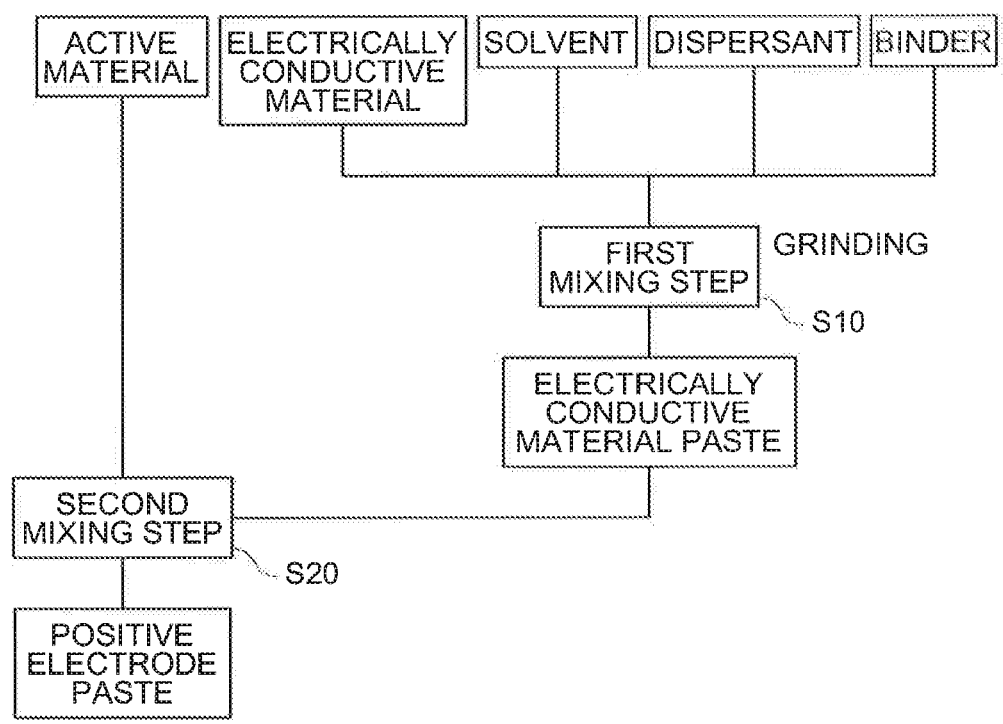
FIG. 3 is a process flow illustrating the composition formation step according to an embodiment of the present invention.

It is preferred that, firstly, as shown in FIG. 3, an electrically conductive material be mixed with a binder and a solvent to form an electrically conductive material composition (hereinafter may be referred to as electrically conductive material paste) before the addition of positive electrode active material particles (first mixing step; S10), and then positive electrode active material particles be added to the electrically conductive material paste to form a positive electrode active material layer forming paste (second mixing step; S12). In the first mixing step (S10), the electrically conductive material is dispersed and mixed under grinding so as to achieve the above-described specific particle size distribution of the electrically conductive material. In the second mixing step (S20), dispersion and mixing may be carried out in such a manner that the electrically conductive material, which has been adjusted to have the specific particle size distribution, the positive electrode active material particles, and the binder are uniformly dispersed. In this manner, when the dispersion and mixing of the electrically conductive material and the positive electrode active material are separately carried out, a positive electrode active material layer forming paste in which the positive electrode active material particles, the electrically conductive material, and the binder are uniformly dispersed is obtained, the electrically conductive material having an appropriately controlled particle size distribution.

The first mixing step (S10) and second mixing step (S12) may use the same or different dispersers. From the viewpoint of productivity; it is preferred that the same (common) disperser be used. When the same disperser is used, the dispersion force for dispersing the electrically conductive material in the first mixing step and the dispersion force for dispersing the positive electrode active material particles in the second mixing step may be the same or different. In this manner, when the electrically conductive material and positive electrode active material are kneaded separately, and the balance between the dispersion forces applied on them are appropriately adjusted, the particle size distribution of the electrically conductive material is more readily controlled while the dispersibility of the positive electrode active material is maintained favorably.

According to a preferred manner, firstly, an electrically conductive material (average particle diameter 50 μm), a binder, and a solvent are mixed under stirring using a homogenizer at a rotation speed of 3500 to 5000 rpm for a determined time (for example, 60 minutes), thereby kneading the electrically conductive material under grinding so as to achieve the above-described specific particle size distribution, and thus forming an electrically conductive material paste (S10). Subsequently, the positive electrode active material particles (for example, average particle diameter 4 to 5 μm) are added, and mixed under stirring using the homogenizer at a rotation speed of 5500 rpm for 40 to 60 minutes, and thus a positive electrode active material layer forming paste is formed (S12). The positive electrode active material layer forming paste thus obtained has a particle size distribution of the electrically conductive material which has been appropriately adjusted so as to arrange the positive electrode electrically conductive material contained in the active material layer both between the positive electrode active material particles and in the hollow part of the positive electrode active material particles. The kneading conditions may be appropriately changed according to, for example, the shape of the positive electrode active material (for example, particle diameter), other components, constitution, and design.

The electrically conductive material paste may contain, as necessary, other material which works as a dispersant. As a result of this, the particle size distribution of the electrically conductive material is more appropriately controlled. Examples of the dispersant include polymer compounds having a hydrophobic chain and a hydrophilic group, such as polyvinyl butyral and polyvinyl pyrrolidone. Other examples include anionic compounds having sulfate, sulfonate, or phosphate, and cationic compounds such as amine.

The positive electrode active material layer forming paste disclosed herein has a relatively low viscosity, because the particle size distribution of the electrically conductive material in the paste has been adjusted as described above. The positive electrode active material layer forming paste typically has a relatively low viscosity, for example, 10000 mPa·s or less (for example, from 4000 mPa·s to 10000 mPa·s), preferably 9000 mPa·s or less (for example 4000 mPa·s to 9000 mPa·s), more preferably 8000 mPa·s or less (for example 4000 mPa·s to 8000 mPa·s)) as measured using a commercially available E type viscometer at a liquid temperature of 25° C. and a shear rate of 2 $s^{-1}$. The use of the positive electrode active material layer forming paste, the viscosity of which has been adjusted as described above, allows stable production of a positive electrode in which the positive electrode electrically conductive material contained in the active material layer is arranged both between the positive electrode active material particles and in the hollow part of the positive electrode active material particles. The paste having this viscosity range is preferred also from the viewpoint of handleability (for example, coating properties when the paste is applied to a positive electrode current collector to make an electrode). The lower limit of the viscosity of the paste is not particularly limited, but if the viscosity is too low, the paste may run during application of the paste to the current collector. The viscosity suitable for coating is about 2000 mPa·s or more.

In the coating step, the positive electrode active material layer forming paste obtained by the above-described mixing and dispersion is applied to the positive electrode current collector (typically coated and dried) to obtain a positive electrode active material layer. The operation of application (coating herein) of the positive electrode active material layer forming paste to the positive electrode current collector may be carried out in the same manner as in making of a conventional common lithium secondary battery positive electrode. For example, the positive electrode current collector is coated with a predetermined amount of the positive electrode active material layer forming paste at a uniform thickness using an appropriate coating device (for example, a slit coater, a die coater, or a comma coater) to produce a positive electrode active material layer. Thereafter, the coated product is dried using an appropriate drying means (typically at 70 to 200° C.), thereby removing the solvent from the positive electrode active material layer forming paste. As a result of the removal of the solvent from the positive electrode active material layer forming paste, a positive electrode active material layer containing the positive electrode active material, the electrically conductive material, and the binder is formed. In this manner, a positive electrode having a positive electrode active material layer formed on a positive electrode current collector can be obtained. Appropriate press treatment (for example, roll press treatment) may be carried out after drying, as necessary, to adjust the thickness and density of the positive electrode active material layer.

The electrode thus obtained (positive electrode in this example) includes, as shown in FIG. 1, the positive electrode active material layer 14 supported on the positive electrode current collector 12, the positive electrode active material layer 14 containing the positive electrode active material particles 30, the electrically conductive material 16, and the binder 18. The positive electrode active material particles 30 has a hollow structure composed of the shell 35 and the hollow part 34 formed therein. The shell 35 has the through hole 36 penetrating from the outside to the hollow part 34. The electrically conductive material 16 can be ground so as to have a particle size distribution which allows a portion of the electrically conductive material to enter into the hollow part of the active material particles and to be arranged therein in the first mixing step of the paste formation step. The electrically conductive material 16 is typically smaller than the positive electrode active material particles 30, and enters into the spaces between the positive electrode active material particles 30. A portion of the electrically conductive material 16 is smaller than the opening width of the through hole 36 (for example, about 1 μm), and enters into the hollow part 34 of the positive electrode active material particles through the through hole 36. According to this production method, a lithium secondary battery in which the electrically conductive material 16 contained in the positive electrode active material layer 14 is arranged both in the hollow part 34 of the positive electrode active material particles and between the positive electrode active material particles 30 is appropriately produced. In addition, according to this production method, the electrically conductive material 16 is arranged independent of the positive electrode active material particles 30, without incorporating the positive electrode active material particles 30 with the electrically conductive material 16. As a result of this, higher battery performance is achieved without inhibition of reaction of the positive electrode active material 30.

The electrode achieves, for example, more efficient electron transfer between the active material layer and current collector, and thus is suitable as a component of a battery of any form or a component (for example, positive electrode)

of the electrode assembly contained in the battery. For example, the electrode is suitable as a component of a lithium secondary battery including a positive electrode produced by any of the methods disclosed herein, a negative electrode (the negative electrode may be produced according to the present invention), an electrolyte arranged between the positive and negative electrodes, and typically a separator which separates the positive and negative electrodes (the separator may be omitted in a battery including a solid or gelatinous electrolyte). The structure and size of the outer container composing the battery (for example, a metal cabinet or a laminate film structure), or the structure of the electrode assembly composed mainly of positive and negative electrode current collectors (for example, a winding structure or a laminated structure) are not particularly limited.

Figure 4:
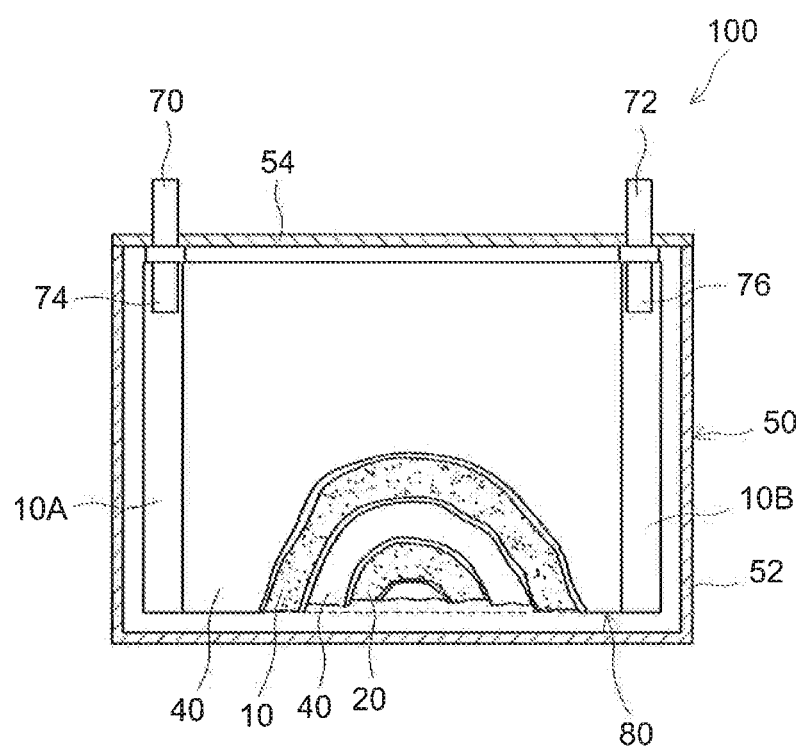
FIG. 4 schematically shows the lithium secondary battery according to an embodiment of the present invention.

An embodiment of the lithium secondary battery assembled using the positive electrode (positive electrode sheet) 10 produced using the above-described method is described below with reference to the schematic view shown in FIG. 4. As shown in the figure, the lithium secondary battery 100 according to this embodiment includes a metal case 50 (resin or laminate film case is also preferred). The case (outer container) 50 includes a flat, rectangular-solid case body 52 having an open top end, and a cap 54 covering the opening. The top face of the case 50 (more specifically the cap 54) has a positive electrode terminal 70 which is electrically connected to the positive electrode 10 of a wound electrode body 80, and a negative electrode terminal 72 which is electrically connected to a negative electrode 20 of the electrode assembly. The case 50 contains a flat wound electrode body 80 which is made by, for example, laminating and winding the long, sheet-shaped positive electrode (positive electrode sheet) 1.0 and the long, sheet-shaped negative electrode (negative electrode sheet) 20 together with two long, sheet-shaped separators (separator sheets) 40, and then pressing the wound body thus obtained from the side direction.

The positive electrode sheet 10 includes, as described above, the positive electrode active material layer 14 composed mainly of the positive electrode active material 30 (see FIG. 1) formed on the both surfaces of the long, sheet-shaped positive electrode current collector 12. The negative electrode sheet 20 includes, in the same manner as the positive electrode sheet 10, negative electrode active material layers composed mainly of a negative electrode active material on the both sides of a long, sheet-shaped negative electrode current collector. One end of these electrode sheets 10 and 20 in the width direction has active material layer-free parts 10A and 10B having no active material layer on both surfaces.

At the time of the lamination, the positive electrode sheet 10 is placed on the negative electrode sheet 20 slightly displaced from each other in the width direction, in such a manner that the positive electrode active material layer-free part of the positive electrode sheet 10 and the negative electrode active material layer-free part of the negative electrode sheet 20 protrude from the both sides of the separator sheets 40 in the width direction. As a result of this, in the transverse direction to the winding direction of the wound electrode body 80, the active material layer-free parts 10A and 20A of the positive electrode sheet 10 and negative electrode sheet 20 protrude outwardly from the winding core part (more specifically, the positive electrode active material layer formed part of the positive electrode sheet 10, the negative electrode active material layer formed part of the negative electrode sheet 20, and two separator sheets 40 are closely wound part). The protrusion on the positive electrode side (or the positive electrode active material layer-free part) 10A and the protrusion on the negative electrode side (or the negative electrode active material layer-free part) 20A are equipped with a positive electrode lead terminal 74 and a negative electrode lead terminal 76, respectively, through which electrically connected to the positive electrode terminal 70 and the negative electrode terminal 72, respectively.

The components of the wound electrode body 80 other than the positive electrode sheet 10 are not particularly limited, and may be the same as the electrode assembly of the conventional lithium secondary batteries. For example, the negative electrode sheet 20 may be formed by applying a negative electrode active material layer composed mainly of a lithium secondary battery negative electrode active material on a long negative electrode current collector. The negative electrode current collector is preferably made of copper foil or other metal foil suitable for a negative electrode. The negative electrode active material may be composed one or two or more substances used in the conventional lithium secondary batteries without any limitation. Preferred examples include carbon materials such as graphite carbon and amorphous carbon, lithium transition metal complex oxides (for example, lithium titanium complex oxide), and lithium transition metal complex nitrides.

Preferred examples of the separator sheets 40 used between the positive and negative electrode sheets 10 and 20 include those composed of a porous polyolefin resin. When the electrolyte is a solid or gelatinous electrolyte, the separator may be unnecessary (more specifically, in this case, the electrolyte itself works as a separator).

The wound electrode body 80 is placed into the case body 52 from the top opening of the case body 52, and at the same time an electrolytic solution containing an appropriate electrolyte is placed (poured) into the case body 52. The electrolyte may be, for example, a solution of a supporting electrolyte such as $LiPF_6$ in a nonaqueous solvent. For example, an appropriate amount (for example, 1 M) of a lithium salt such as $LiPF_6$ is dissolved in a nonaqueous solvent such as a mixed solvent of diethyl carbonate and ethylene carbonate (for example, mass ratio 1:1), and used as an electrolyte (typically an electrolytic solution).

Thereafter, the opening is sealed by welding to the cap 54, and thus accomplishing the assembly of the lithium secondary battery 100 according to this embodiment. The sealing of the case 50 and placement (pouring) of the electrolyte may be carried out in the same manner as those fir the production of the conventional lithium secondary batteries, and will not characterize the present invention, in this manner, assembly of the lithium secondary battery 100 according to the present embodiment is completed. The lithium secondary battery 100 thus assembled includes, as described above, at least one electrode having low internal resistance, and thus shows excellent battery performance. For example, the battery (for example, lithium secondary battery) assembled using the above-described electrode shows excellent output characteristics (particularly output characteristics in low temperature environments).

The test examples of the present invention are described below, but the present invention will not be limited to these test examples. For the test examples, positive electrode active material particles having a holed hollow structure were provided. In addition, positive electrode sheets composed of electrically conductive materials having different particle size distributions were made. Lithium secondary batteries for evaluation test were assembled using the positive electrode sheets, and their performance was evaluated.

<Formation of Active Material Layer Forming Paste>

[Sample 1]

Figure 5:
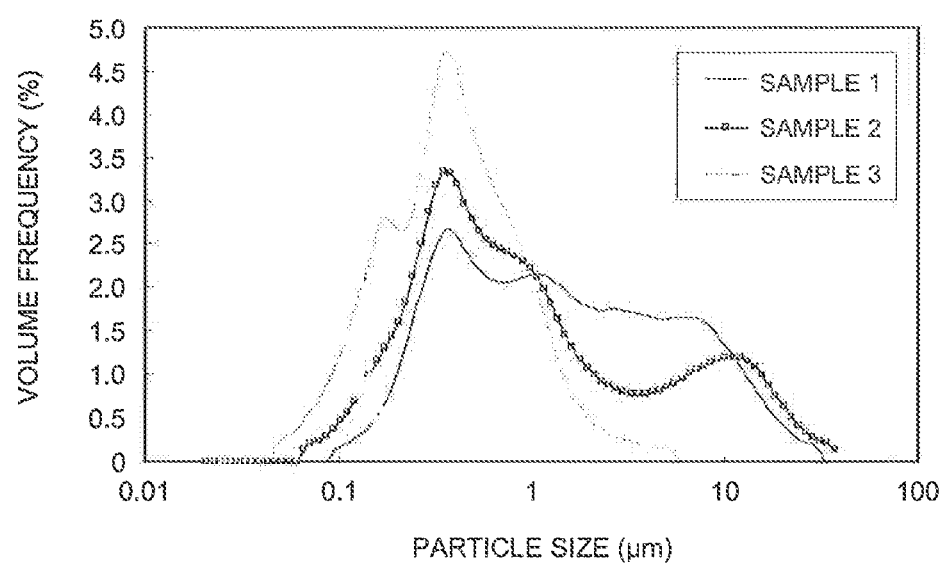
FIG. 5 shows the parade size distribution of an electrically conductive material used in one test example of the present invention.

As shown in FIG. 3, 9 parts by weight of AB as the electrically conductive material (average particle diameter 50 μm), 2.24 parts by weight of PVDF as the binder, 0.224 parts by weight of polyvinyl butyral as the dispersant, and 88.536 parts by weight of NMP as the solvent were charged into a homogenizer, and kneaded under stirring at 3000 rpm for 60 minutes at 25° C., thereby forming an electrically conductive material paste (first mixing step; composition formation step). The particle size distribution of the electrically conductive material powder contained in the electrically conductive material paste was measured using a commercially available laser diffraction particle size distribution analyzer, and the results are shown in Table 1 and FIG. 5. Table 1 lists the 10% accumulated particle diameter (D10), the 50% accumulated particle diameter (D50), the 90% accumulated particle diameter (D90), and the mean volume diameter (MV). The viscosity of the electrically conductive material paste was about 10050 mPa·s as measured by an E type viscometer (liquid temperature 25° C., shear rate 2 s$^{-1}$).

To the electrically conductive material paste thus obtained, 50.3 parts by weight of $LiNi_{1/3}Co_{1/3}Mn_{1/3}O_2$ powder as the positive electrode active material particles having a holed hollow structure are added, and kneaded under stirring using the homogenizer at a rotation speed of 5500 rpm for 40 minutes, thereby obtaining a positive electrode active material layer forming paste (second mixing step; paste formation step). The positive electrode active material particles having a holed hollow structure were made by appropriately adjusting the conditions of the formation of the positive electrode active material particles (for example, the pH during the starting hydroxide formation step, ammonium ion concentration, and maximum burning temperature).

[Sample 2]

An electrically conductive material paste was formed in the same manner as in Sample 1, except that the rotation speed of the homogenizer in the first mixing step was changed to 3500 rpm. The particle size distribution of the electrically conductive material powder contained in the electrically conductive material paste is shown in Table 1 and FIG. 5. In the same manner as in Sample 1, a positive electrode active material layer forming paste was obtained.

[Sample 3]

An electrically conductive material paste was formed in the same manner as in Sample 1, except that the rotation speed of the homogenizer in the first mixing step was changed to 4000 rpm. The particle size distribution of the electrically conductive material powder contained in the electrically conductive material paste is shown in Table 1 and FIG. 5. In the same manner as in Sample 1, a positive electrode active material layer forming paste was obtained.

[Sample 4]

An electrically conductive material paste was formed in the same manner as in Sample 1, except that the rotation speed of the homogenizer in the first mixing step was changed to 6000 rpm. The particle size distribution of the electrically conductive material powder contained in the electrically conductive material paste is shown in Table 1. In the same manner as in Sample 1, a positive electrode active material layer forming paste was obtained.

TABLE 1

| | | Sample 1 | Sample 2 | Sample 3 | Sample 4 |
|---|---|---|---|---|---|
| Rotation speed of homogenizer (rpm) | | 3000 | 3500 | 4000 | 6000 |
| Particle size distribution (μm) | D10 | 0.268 | 0.199 | 0.125 | 0.145 |
| | D50 | 1.221 | 0.712 | 0.364 | 0.204 |
| | D90 | 8.791 | 10.46 | 1.086 | 0.578 |
| | MV | 3.1497 | 3.1277 | 0.5425 | 0.289 |
| Viscosity (mPa · s) | | 10050 | 9325 | 7387 | 3520 |

[Sample 5]

Figure 6:
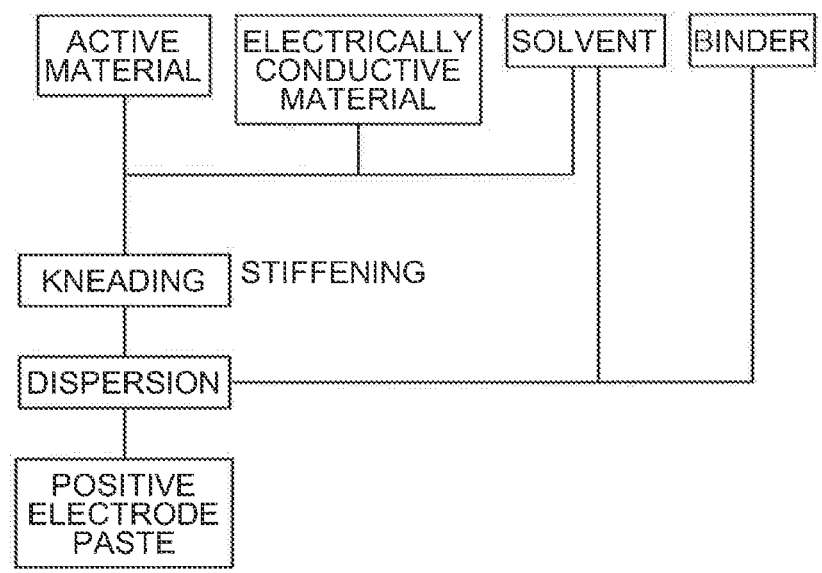
FIG. 6 is a process flow illustrating the composition formation step of Sample 5.

In the composition formation step, the positive electrode active material layer forming paste was formed without using the electrically conductive material paste. Specifically, as shown in FIG. 6, 64.1 parts by weight of $LiNi_{1/3}Co_{1/3}Mn_{1/3}O_2$ powder as the positive electrode active material having a holed hollow structure, 5.7 parts by weight of AB as the electrically conductive material, 28.8 parts by weight of NMP as the solvent were charged into a planetary mixer, and kneaded under stirring (stiffened) at a rotation speed of 40 rpm for 60 minutes at 25° C. Subsequently, 1.4 parts by weight of PVDF as the binder, 15.2 parts by weight of NMP as the solvent were further charged into the planetary mixer, and dispersed under stirring at a rotation speed of 50 rpm for 30 minutes, thereby obtaining a positive electrode active material layer forming paste.

<Making of Positive Electrode Sheet>

The positive electrode active material layer forming pastes of Samples 1 to 5 were individually applied to the both sides a long, sheet-shaped positive electrode current collector made of aluminum foil having a thickness of 15 μm, and dried to make a positive electrode sheet having positive electrode active material layers on the both sides of a positive electrode current collector. The coating weight of the positive electrode active material layer forming paste was adjusted to about 11.2 mg/cm$^2$ (solid content base) in total of the both sides. After drying, the sheet was pressed in such manner that the positive electrode active material layer had a thickness of about 66 μm.

The cross section of the positive electrode active material layer of the positive electrode sheets thus obtained was observed by a scanning electron microscope (SEM). The results are shown in FIGS. 7 to 10. FIGS. 7 to 10 show SEM images of the cross section of Samples 1 to 3 and 5.

Figure 7:
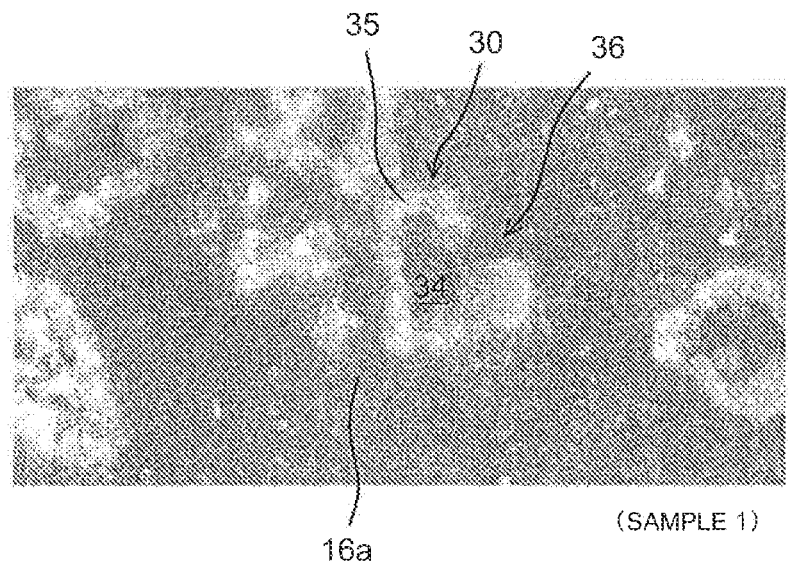
FIG. 7 is a cross-sectional SEM micrograph of the positive electrode active material layer according to Sample 1.
Figure 8:
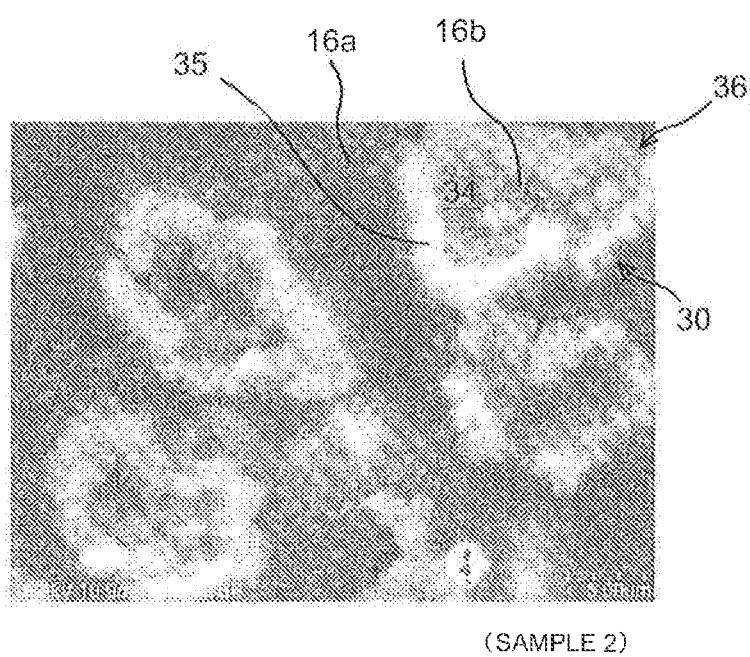
FIG. 8 is a cross-sectional SEM micrograph of the positive electrode active material layer according to Sample 2.
Figure 9:
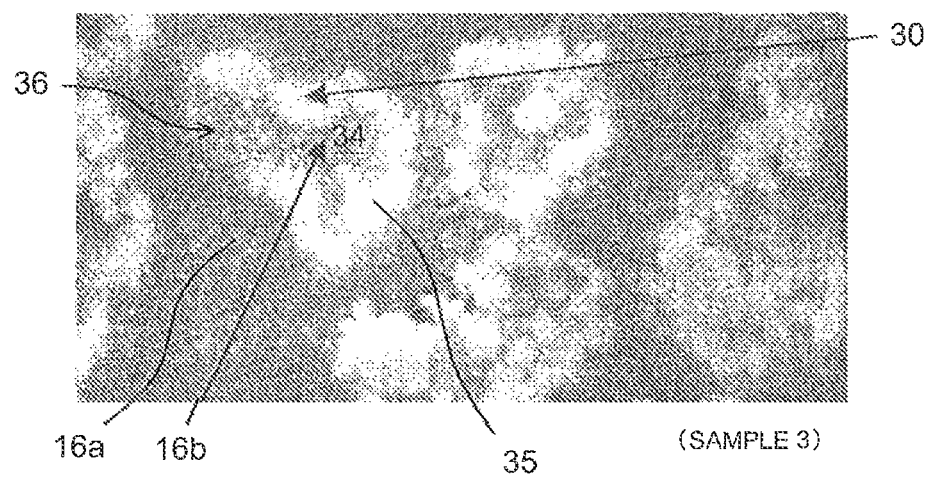
FIG. 9 is a cross-sectional SEM micrograph of the positive electrode active material layer according to Sample 3.
Figure 10:
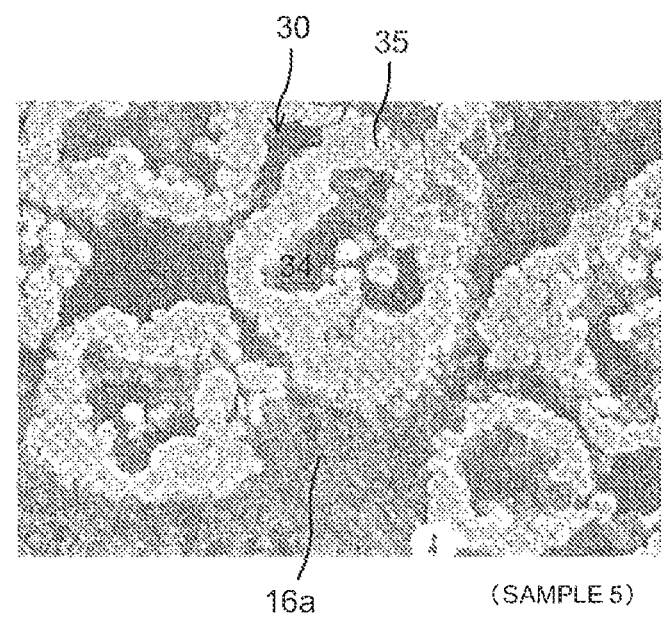
FIG. 10 is a cross-sectional SEM micrograph of the positive electrode active material layer according to Sample 5.

As shown in FIG. 7, in Sample 1 in which the 10% accumulated particle diameter (D10) of the electrically conductive material was 0.268 pan, the spots showing the presence of the electrically conductive material 16a were observed only between the positive electrode active material particles 30, but no electrically conductive material was observed in the hollow part 34 of the positive electrode active material particles. Also in Sample 5 in which the electrically conductive material paste was not used, the spots showing the presence of the electrically conductive material 16a were observed only between the positive electrode active material particles 30, but no electrically conductive material was observed in the hollow part 34 of the positive electrode active material particles (FIG. 10). On the other hand, in Samples 2 to 4 in which the 10% accumulated particle diameter (D10) of the electrically conductive material was smaller than that in Sample 1, as shown in FIGS. 8 and 9, the spots showing the presence of the electrically conductive material 16a were observed between the positive electrode active material particles 30, and the spots showing the presence of the electrically conductive material 16h were also observed in the hollow part 34 of the positive electrode active material particles. The electrically conductive material 16b was connected to the electrically conductive material 16a out of the positive electrode active material through the through holes. These results indicate that the electrically conductive materials 16a and 16b may be arranged both in the hollow part 34 of the positive electrode active material particles and in the spaces between the positive electrode active material particles 30 when the active material particles having a holed hollow structure is used, and the 10% accumulated particle diameter (D10) of the electrically conductive material is 0.25 µm or less.

Test lithium secondary batteries for test were made using the produced positive electrode sheets according to Samples 1 to 5, and evaluated for the low temperature output characteristics. The lithium secondary batteries for test were made as follows.

<Making of Negative Electrode Sheet>

Graphite powder as the negative electrode active material, SBR as the binder, and CMC as the thickening agent were mixed in water in such a manner that the mass ratio between these materials was 98:1:1, and thus making a negative electrode active material layer forming paste. The negative electrode active material layer forming paste was applied in the form of a strip to the both sides of a long, sheet-shaped negative electrode current collector made of copper foil with a thickness of 10 µm, and dried to make a negative electrode sheet having negative electrode active material layers on the both sides of the negative electrode current collector. The coating weight of the negative electrode active material layer forming paste was adjusted to about 7.1 mg/cm$^2$ (solid content base) in total of the both sides. After drying, the sheet was pressed in such a manner that the negative electrode active material layer had a thickness of about 73 µm.

<Making of Lithium Secondary Battery>

The positive and negative electrode sheets were overlaid with each other and wound with two separator sheets (monolayer structure made of porous polyethylene) sandwiched therebetween, and the wound body was flattened in the side direction, thereby making a flat, wound electrode body. The wound electrode body was contained in a box-shaped battery container together with a nonaqueous electrolyte solution, and the opening of the battery container was hermetically sealed. The nonaqueous electrolyte solution was a mixed solvent composed of ethylene carbonate (EC), diethyl carbonate (DEC), and methyl propionate at a volume ratio of 3:5:2 containing about 1 mol/l of $LiPF_6$ as a supporting electrolyte. In this manner a lithium secondary battery was assembled. Thereafter, initial charge and discharge treatment (conditioning) was carried out in accordance with a common procedure, and thus obtaining a lithium secondary battery for test.

<Measurement of Rated Capacity>

Subsequently, the lithium secondary batteries for test assembled as described above were measured for the rated capacity at a temperature of 25° C. in the voltage range from 3.0 V to 4.1 V, in accordance with the following steps 1 to 3.

Step 1: The battery is discharged to 3.0 V at a constant current of 1 C, and then discharged for 2 hours at a at a constant voltage, and a pause for 10 seconds is made.

Step 2: The battery is discharged to 4.1 V at a constant current of 1 C, and then charged for 2.5 hours at a at a constant voltage, and a pause for 10 seconds is made.

Step 3: The battery is discharged to 3.0 V at a constant current of 0.5 C, and then discharged for 2 hours at a at a constant voltage, and a pause for 10 seconds is made.

The discharge capacity in the discharge from the constant current discharge to the constant voltage discharge (CCCV discharge capacity) in the Step 3 was recorded as the rated capacity. The rated capacity of the lithium secondary batteries for test was about 4 Ah.

<SOC Adjustment>

The SOC of the lithium secondary batteries for test was adjusted in accordance with the following steps 1 and 2. In order to uniform the influences of the temperature, the SOC was adjusted at a temperature of 25° C.

Step 1: The battery is charged at a constant current of 1 C from 3 V to the state of charge equivalent to 60% the rated capacity (SOC 60%). The term "SOC" means State of Charge.

Step 2: Following Step 1, the battery is charged for 2.5 hours at a constant voltage.

As a result of this, the lithium secondary battery for test was adjusted to the intended state of charge.

<Output Characteristics at −30° C. and SOC 27%>

The lithium secondary batteries for test obtained as described above were measured for the output characteristics at −30° C. and SOC 27%. The output characteristics were measured in accordance with the following steps.

Step 1: The battery is charged from 3.0 V to SOC 27% (herein 3.57 V) at normal temperature (herein 25° C.) and a constant current of 1 C, and then charged for 1 hour at a constant voltage.

Step 2: The battery charged to SOC 27% is allowed to stand for 6 hours in a constant temperature bath at 30° C.

Step 3: Following Step 2, the battery is discharged from SOC 27% at a temperature of −30° C. and a constant current of 10 C. The discharge voltage at this time is plotted along the ordinate, and the time is plotted along the abscissa.

Figure 11:
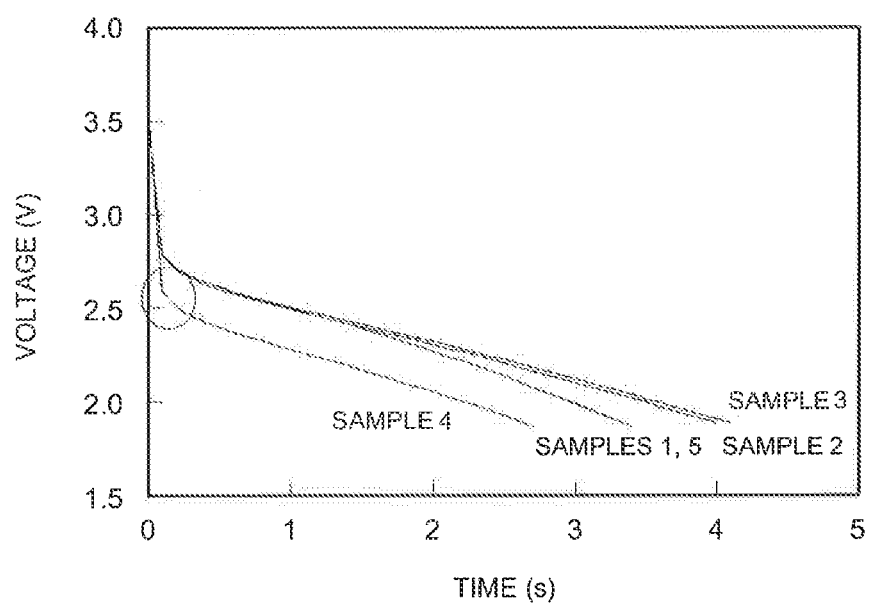
FIG. 11 is a graph showing the relationship between the discharge voltage and time.

The result is shown in FIG. 11. FIG. 11 is a graph showing the relationship between the discharge voltage and time.

As shown in FIG. 11, the voltage decreases in the batteries of Samples 2 and 3, in which the electrically conductive material had been arranged both between the positive electrode active material particles and in the hollow part, were smaller than in the batteries of Samples 1 and 5, in which the electrically conductive material had been arranged only between the positive electrode active material particles. These facts indicate that the arrangement of the electrically conductive material both between the positive electrode active material particles and in the hollow part of the positive electrode active material particles allow the improvement of the low temperature output characteristics. In the battery of Sample 5, the electrically conductive material was arranged both between the positive electrode active material particles and in the hollow part of the positive electrode active material particles, but the battery showed inferior low temperature output characteristics compared to the batteries of Sample 1 and 5. The reason for this is likely that, in Sample 5, the particle size distribution of the electrically conductive material was too small, so that the electrically conductive material arranged between the positive electrode active material particles had a small diameter, and thus the electrically conductive paths between the positive electrode active material particles were thin. In order to form thick electrically conductive paths between the positive electrode active material particles, the 90% accumulated particle diameter (D90) of the electrically conductive material is preferably 1 µm or more.

The present invention is explained above with reference to preferred embodiments, but the explanations are not limited, and may be subjected to various modifications.

Figure 12:
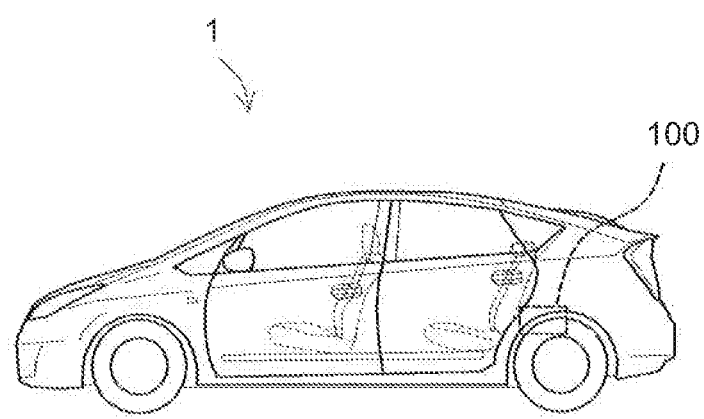
FIG. 12 is a side view schematically showing a vehicle equipped with a lithium secondary battery.

The lithium secondary battery according to the present invention has excellent low temperature output characteristics as described above, and thus is particularly suitable as a motor power supply mounted on a vehicle such as an automobile. Accordingly, the present invention provides, as shown in FIG. 12, a vehicle 1 including the battery 100 (may be in the form of a battery pack) as the power supply (typically automobile, specifically an automobile equipped with a motor, such as a hybrid automobile, an electric vehicle, or a fuel battery automobile).

INDUSTRIAL APPLICABILITY

The present invention can provide a lithium secondary battery having markedly improved output characteristics at low temperatures.

The invention claimed is:

1. A lithium secondary battery comprising:
   a current collector; and
   an active material layer which is supported on the current collector and contains active material particles and electrically conductive particles,
   the active material particles each having:
   a shell composed of a lithium transition metal oxide;
   a hollow part formed in the shell; and
   a through hole penetrating the shell,
   wherein the electrically conductive particles contained in the active material layer are arranged both in the hollow part of the active material particles and between the active material particles, and
   the electrically conductive particles arranged in the hollow part of the active material particles are formed independent of the active material particles.

2. The lithium secondary battery according to claim 1, wherein the electrically conductive particles arranged in the hollow part of the active material particles are electrically connected through the through holes with the electrically conductive particles arranged between the active material particles.

3. The lithium secondary battery according to claim 1, which has a 10% accumulated particle diameter (D10) of 0.25 μm or less and a 90% accumulated particle diameter (D90) of 1 μm or more in a particle size distribution determined by laser diffraction of the electrically conductive particles.

4. The lithium secondary battery according to claim 1, wherein a ratio of the electrically conductive particles arranged in the hollow part of the active material particles is from 3% to 30% by mass with reference to the total mass of the electrically conductive particles contained in the active material layer.

5. The lithium secondary battery according to claim 1, wherein the lithium transition metal oxide is a compound having a layered crystal structure containing at least nickel as a constituent element.

6. The lithium secondary battery according to claim 1, which is used as a driving power supply for a vehicle.

7. A method of producing a lithium secondary battery, comprising:

a step of preparing active material particles with a holed hollow structure each having a shell composed of a lithium transition metal oxide, a hollow part formed in the shell, and a through hole penetrating the shell;

a step of forming an active material layer forming composition by mixing the active material particles, electrically conductive particles, and a solvent;

a step of applying the active material forming composition to a current collector, thereby obtaining an electrode composed of an active material layer formed on the current collector; and a step of assembling a lithium secondary battery using the electrode, wherein the composition formation step uses electrically conductive particles and active material particles with a holed hollow structure, the electrically conductive particles having a particle size distribution which allows a portion of the electrically conductive particles to enter into the hollow part of the active material particles through the through holes and to be arranged therein as independent of the active material particles.

8. The production method according to claim 7, wherein as the electrically conductive particles having the particle size distribution, electrically conductive particles having the 10% accumulated particle diameter (D10) of 0.25 μm or less and the 90% accumulated particle diameter (D90) of 1 μm or more are used.

9. The production method according to claim 7, wherein the composition formation step includes:
   a first mixing step of mixing the electrically conductive particles with the solvent to form an electrically conductive material composition; and
   a second mixing step of mixing the electrically conductive material composition with the active material particles to obtain the active material forming composition, wherein
   in the first mixing step, the electrically conductive particles are mixed under grinding such that the electrically conductive particles have a particle size distribution which allows a portion of the electrically conductive conductive particles to enter into the hollow part of the active material particles through the through holes and to be arranged therein.

10. The lithium secondary battery according to claim 1, wherein the 10% accumulated particle diameter (D10) of the electrically conductive particles is smaller than the average opening width of the through hole and the 90% accumulated particle diameter (D90) of the electrically conductive particles is greater than the average opening width of the through hole.

11. The lithium secondary battery according to claim 1, wherein the electrically conductive particles arranged in the hollow part of the active material particles are the same as the electrically conductive particles arranged between the active material particles.

12. The lithium secondary battery according to claim 1, wherein the active material particles are not incorporated with the electrically conductive particles.

* * * * *